Patented Feb. 6, 1923.

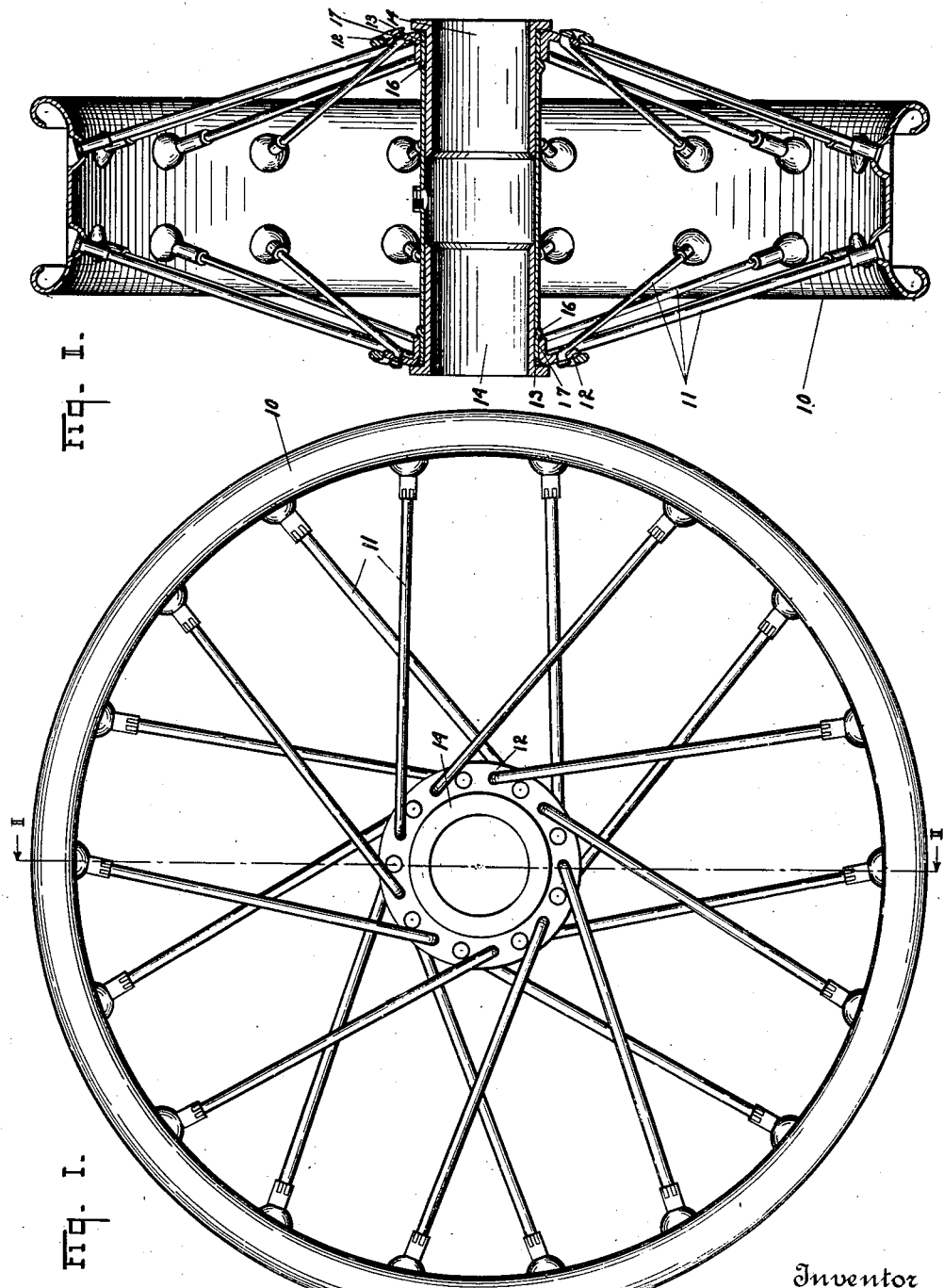

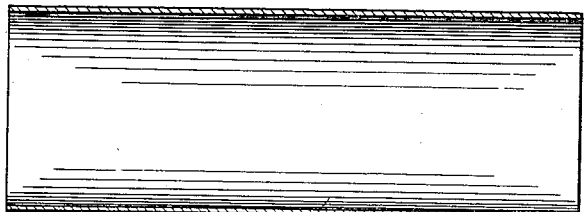
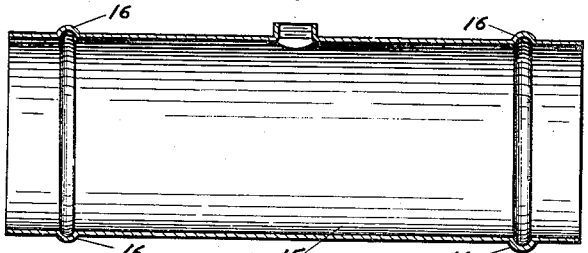
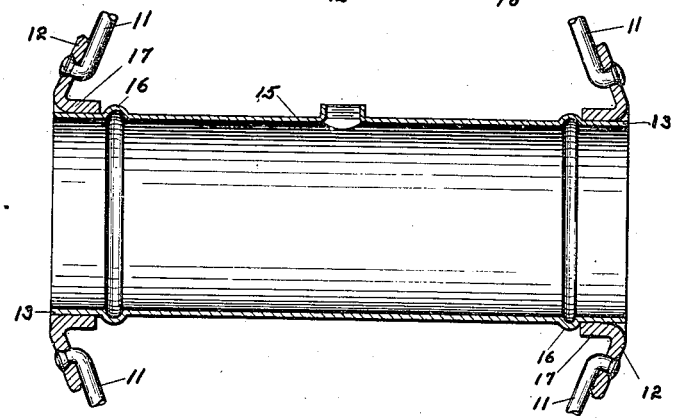
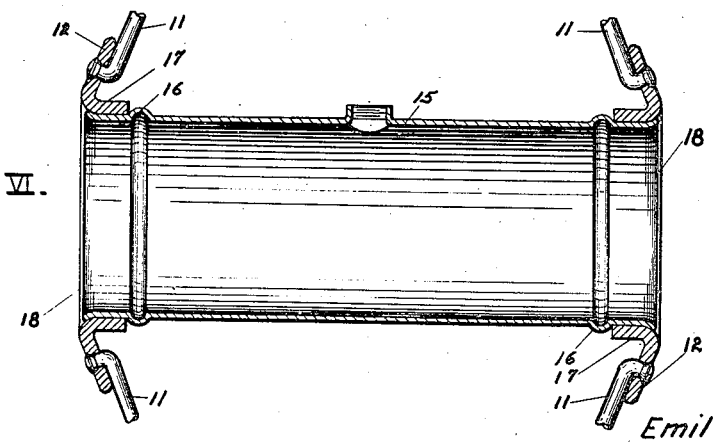

1,443,954

UNITED STATES PATENT OFFICE.

EMIL IBACH, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

WHEEL.

Application filed December 15, 1917. Serial No. 207,301.

*To all whom it may concern:*

Be it known that I, EMIL IBACH, a subject of the Emperor of Germany, who have declared my intention to become a citizen of the United States, residing at Philadelphia, in the county of Philadelphia and State of Pennsylvania, have invented certain new and useful Improvements in Wheels, of which I declare the following to be a full, clear, and exact description.

This invention relates to improvements in wire wheels and more particularly in the hub construction of wire wheels.

The principal object of this invention is to provide an improved hub construction for wire wheels, which may be produced and constructed very cheaply and economically without losing any of the strength or efficiency of the hub construction.

A further object of my invention is to provide a hub construction for wire wheels in which the hub proper may be formed from commercial steel tubing and the spoke flanges stamped out of steel and mounted upon the steel tubing constituting the hub proper, the hub being provided with annular stop rings, preventing inward movement of the spoke flanges toward each other on the tubing.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which, Fig. I is a view in side elevation of a wheel constructed in accordance with my invention.

Fig. II is a vertical, sectional view, taken substantially on the line II—II of Fig. I.

Fig III is a longitudinal, sectional view, taken through the section of steel tubing from which the hub is formed.

Fig. IV is a view of the hub after the abutment beads have been formed thereon.

Fig. V is a view of the hub after the beads have been formed thereon and the spoke flanges have been assembled in position.

Fig. VI is a view of the completed hub after the spoke flanges have been secured in place thereon by swaging out the ends of the hub.

In the drawings, similar reference numerals refer to similar parts throughout the several views, and the sectional views are taken looking in the direction of the little arrows at the ends of the section lines.

Considering the numbered parts of the drawing, I have shown a wheel comprising the rim 10, spokes 11 and spoke flanges 12, which are mounted on the hub 13. The bearing bushings 14 are mounted within the hub 13 at each end thereof.

My invention has to do with the construction of the hub, by means of which the hub may be formed of a section of ordinary commercial steel tubing, which is so formed as to receive the spoke flanges and support them while preventing inward movement of these flanges toward each other under the tension of the spokes. The construction of the hub is illustrated in detail in Figs. III to VI inclusive. In Fig. III, I have shown a section of ordinary commercial steel tubing, from which the hub is formed. The annular beads 16 are first formed in this section of steel tubing near the ends thereof, as clearly shown in Fig. IV. The spoke flanges 12 are stamped out of steel and comprise the cylindrical central portion 17, which is disposed on the end of the tubing 15, and the inclined spoke flange 12. The inner edges of the rings 17 engage and abut the beads 16, which are formed in the tubing 15 constituting the hub. The ends of the tubing 15 are then swaged outwardly, as shown in Fig. VI, so that the rings 17 of the spoke flanges 12 are securely held in place with their inner edges abutting the beads 16 formed in the tubing 15. The ordinary practice in the construction of hubs for wire wheels is to take a solid bar of steel and machine the hub therefrom, the spoke flanges being formed integral with the hub proper and being machined out to their required form. This method of manufacture is wasteful, as much material is wasted in the machining operation and much labor is necessary in order to properly machine the hub. In accordance with my invention, the hub is formed from a section of ordinary commercial steel tubing, which is first operated upon to form the annular abutment beads 16, adjacent each end thereof. The spoke flanges 12 are then slipped in place over the ends of the tubing with the inner edges of the rings 17 abutting the abutment beads 16. The flanges 12 are connected with the rim 10 by means of the spokes 11, and when the spokes are tightened and placed under tension, this tension would tend to draw the spoke flanges 12 toward each other on the tubing 15, if it were not for the abutment beads 16, which prevent the flanges moving inwardly towards each other. The ends of the tubing may be swaged outwardly at 18 as shown in Fig. VI, in order to firmly secure the spoke flanges 12 in place thereon. In accordance with my invention, the machining operations on the hub are entirely eliminated as the spoke flanges are stamped and the abutment rings are formed by beading the section of commerical steel tubing from which the hub is constructed.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A hub for a wire wheel comprising a section of tubing provided with abutment beads formed therein near the ends thereof, a pair of spoke flanges each provided with a cylindrical central portion, said flanges being disposed on the ends of said tubing with the inner edges of said cylindrical central portions engaging said abutment beads, the ends of said tubing being swaged out into contact with the outer edges of said cylindrical portions, and a pair of bushings each provided with an annular flange at one end thereof, said bushings being positioned within the ends of the tubing section in such a manner that the flanged portions thereof will bear against the outer edges of the spoke flanges and support them in position.

2. A hub for a wire wheel comprising a section of tubing having a pair of abutment beads adjacent the ends thereof, a sleeve mounted on each end of said tubing with its inner end engaging the adjacent abutment bead and having an annular spoke flange extending from the outer end of said sleeve and inclined inwardly toward the central plane of the wheel tread, and a bearing sleeve mounted within each end of said tubing and having, at its outer end, an annular flange engaging the base of the adjacent spoke flange.

In testimony whereof I affix my signature.

EMIL IBACH.